Nov. 4, 1969
E. E. HESTON
3,475,787
EXTRUDER
Filed March 6, 1968
2 Sheets-Sheet 1
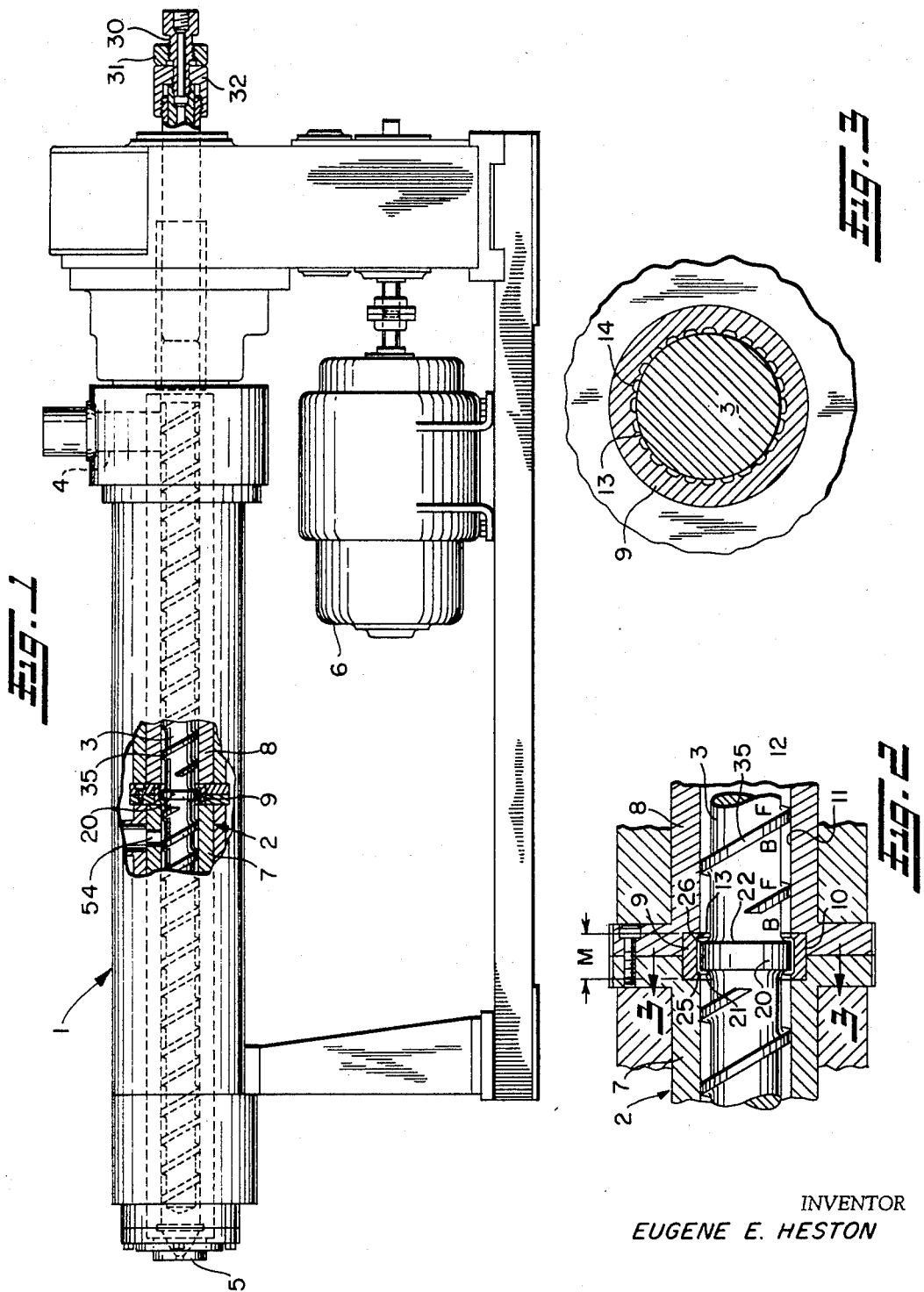
INVENTOR
EUGENE E. HESTON
BY
Oberlin, Maky, Donnelly & Renner
ATTORNEYS Nov. 4, 1969  E. E. HESTON  3,475,787
EXTRUDER Filed March 6, 1968  2 Sheets-Sheet 2

INVENTOR
EUGENE E. HESTON

BY
Oberlin, Maky, Donnelly & Renner
ATTORNEYS

United States Patent Office 3,475,787
Patented Nov. 4, 1969

3,475,787
EXTRUDER
Eugene E. Heston, Akron, Ohio, assignor to NRM Corporation, Akron, Ohio, a corporation of Ohio
Filed Mar. 6, 1968, Ser. No. 711,021
Int. Cl. B29f *3/02*
U.S. Cl. 18—12                 15 Claims

ABSTRACT OF THE DISCLOSURE

An extruder having plural longitudinal flutes or grooves in a section of the cylinder barrel each receiving a portion of the material being fed by the feed screw flight to achieve mixing of the material.

BACKGROUND OF THE INVENTION

This invention relates to a screw-type extruder and more particularly to the manner in which the extruder develops back pressure on the material being extruded to provide more effective mixing of the material than previously obtainable.

Considerable strides have been made in recent years in improving the mixing action of extruders with the introduction of the so-called dam or barrier type screws such as shown and described for example in U.S. Patent No. 3,271,819, granted to Frederick K. Lacher on Sept. 13, 1966. The screw disclosed in such patent is provided with an intermediate transition section having two merging flights which define a pair of helical channels in restricted communication with each other effective to build up pressure in one channel and thus provide selective shearing of the material as it passes through the restriction into the other channel. However, in certain instances the amount of working of the material may not be as great as desired since the material entering the transition section is invariably not conditioned uniformly throughout and yet if it is already conditioned it may freely pass through the transition section with very little added shearing action.

Somewhat better working of the material may be achieved by providing a plurality of longitudinally extending flutes in the transition section of the feed screw, with alternate ones of the flutes closed at the inlet and outlet ends of the transition section to cause the material entering the incoming flutes to pass over a longitudinal dam into the outlet flutes for discharge from the transition section. However, each inlet flute will receive material from a different portion of the feed screw flight, and since the feed section is notorious for not conditioning material uniformly throughout the flight, certain of the inlet flutes will receive conditioned material different from that received by others.

SUMMARY OF THE INVENTION

With the foregoing in mind, it is a principal object of this invention to provide an extruder having plural longitudinal flutes in a section of the cylinder barrel, whereby each flute will be fed a portion of the entire feed screw flight of material. The flutes may be open at both ends, or alternate flutes may be open only at the inlet or outlet ends of the flutes, in which case the material entering the inlet opening flutes must pass over a longitudinal dam for discharge through the outlet opening flutes.

Another object is to provide an extruder of the type described in which the feed screw may be axially adjustable to adjust the amount of material flow into the inlet opening flutes.

A further object is to provide an extruder having a radially adjustable dam communicating the inlet opening flutes with the outlet opening flutes for varying the rate of flow of material between the flutes.

Another object is to provide an extruder in which the flutes in the cylinder barrel are spiral to provide for self cleaning.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWING

In the annexed drawing:

FIG. 1 is a side elevation view, partly in section, showing one form of extruder constructed in accordance with this invention;

FIG. 2 is an enlarged fragmentary longitudinal section of the mixing section of the extruder of FIG. 1;

FIG. 3 is a fragmentary section through the mixing section of FIG. 2, taken on the plane of the line 3—3 thereof;

DESCRIPTION OF THE PREFERRED EMBODIMENTS

Figure 4:
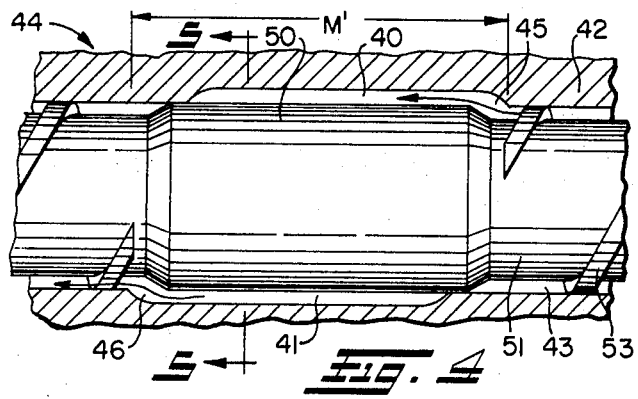
FIG. 4 is an enlarged fragmentary longitudinal section similar to FIG. 2, but showing another form of mixing section which may be incorporated in the extruder of FIG. 1.

Referring now more particularly to the drawings, in FIG. 1 there is shown an extruder 1 generally comprising a cylinder 2 having a feed screw 3 rotatable therein for advancing the material which is introduced through a feed opening 4 at one end of the cylinder toward an extrusion die 5 suitably mounted on the other end. A variable drive motor 6 may be coupled to the feed screw 3 in conventional manner for rotating the feed screw at the desired speed.

Referring further to FIG. 1 and also to FIGS. 2 and 3, the cylinder 2 is desirably formed in two sections 7 and 8 having a mixer valve ring 9 clamped therebetween at an intermediate mixing section M. The mixer valve ring 9 is received in an undercut 10 in the wall 11 of the cylinder bore 12, the inner diameter 13 of the mixer valve ring 9 being approximately flush with the cylinder wall 11 except for the plurality of circumferentially spaced longitudinal grooves or flutes 14 formed therein.

In the region of the mixer valve ring 9 the feed screw 3 is provided with a smooth annular ring 20 having the normal close clearance with the I.D. of the mixer valve ring 9. The leading and trailing edges 21 and 22 of the ring 20 are desirably tapered for cooperation with opposite ends of the flutes 14 to provide restrictions 25 and 26 to the material flow through the flutes 14 which may be varied as by longitudinal adjustment of the feed screw 3. For that purpose, the driven end of the feed screw 3 may have a fitting 30 tightly screwed therein which may be longitudinally adjusted as by loosening the jam nut 31 threaded thereon and turning the nut 32 in either direction to move the feed screw 3 forwardly or rearwardly as desired.

Depending on the size of the restriction 25 or 26, the magnitude of back pressure on the material being advanced by the helical feed screw flight 35 may be varied to promote heating, working, and smearing of the material. As the material is fed toward the mixer valve ring 9, a thin layer of each full flight of material is continuously sliced off by the mixer valve ring for passage through each of the flutes 14, and because the flutes are substantially longitudinal, the spiraling motion of the material is changed to a generally straight forward direction, thereby greatly enhancing the mixing of the material as it passes through the flutes 14. This is an important feature, since a typical feed flight such as shown at 32 is notorious for not conditioning the material uniformly throughout the flight, particularly near the front F and back B of the material load in the screw flight. However, because the material is continually sliced in thin layers by the mixer valve ring 9, the front and back portions F and B of the material load are brought much closer together.

Figure 5:
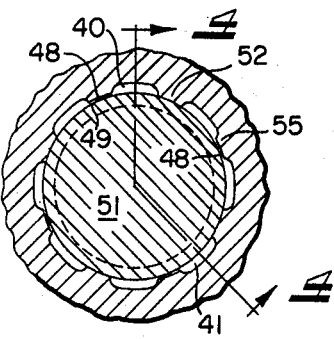
FIG. 5 is a fragmentary transverse section through the mixing section of FIG. 4.

Although the flutes 14 of the FIGS. 1–3 embodiment are shown in the ring 9, it will be apparent that similar flutes 40, 41 may be provided directly in the wall 42 of the cylinder bore 43, as in the extruder 44 of the FIGS. 4 and 5 embodiment. Moreover, alternate ones of the flutes 40 and 41 may have communication with either the inlet end 45 or exit end 46 of the intermediate mixing section M', with restrictive communication between the inlet flutes 40 and an adjacent outlet flute 41. In the form shown in FIGS. 4 and 5, such restrictive communication is established by providing a longitudinal dam 48 in the cylinder wall 42 between each of the inlet flutes 40 and an adjacent outlet flute 41 having a slight radial clearance 49 with the smooth torpedo section 50 of the feed screw 51 which is somewhat greater than the normal close clearance of the ribs 52 between the inlet flutes 40 and the other adjacent outlet flute 41. With this latter construction, in addition to the very effective mixing action which is produced by feeding the material from the feed screw flight 53 into the inlet flutes 40, substantial shearing and conditioning of the material occurs as it passes over the longitudinal dams 48 into the outlet flutes 41 before exiting from the mixing section M'. A cylinder vent 54 (see FIG. 1) may be located immediately ahead of the mixing section M or M' through which gases from the material may be released.

Figure 6:
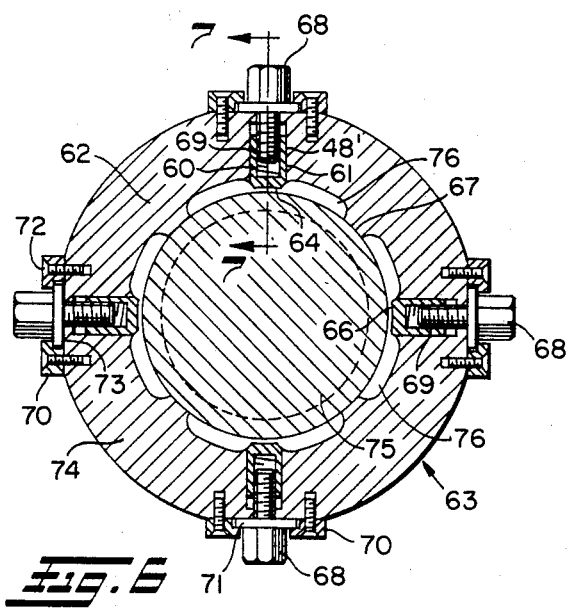
FIG. 6 is an enlarged fragmentary transverse section through still another form of mixing section.
Figure 7:
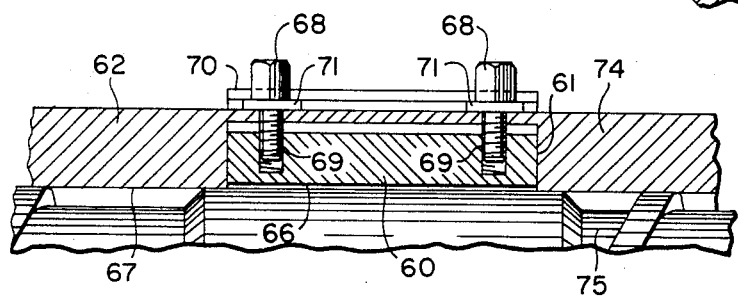
FIG. 7 is a fragmentary longitudinal section through the mixing section of FIG. 6, taken on the plane of the line 7—7 thereof.

The longitudinal dams 48 may be formed simply by providing longitudinal ribs 55 in the cylinder wall 42, in which case the radial clearance 49 between the dams 48 and adjacent torpedo section 50 will be fixed, or alternatively the dams 48' may be in the form of elongated bar members 60 radially adjustable in longitudinal slots 61 in the cylinder wall 62 as illustrated in the extruder 63 of FIGS. 6 and 7 for varying the radial clearance 64. The inner surface 66 of the elongated bar members 60 is desirably on a radius equal to the radius of the cylinder bore 67.

One or more bolts 68 having threaded engagement with radial bores 69 in the elongated bar members 60 and held against radial but not rotational movement by a plate 70 overlying a flange 71 on the bolts permit radial inward and outward movement of the bar members 60 through rotation of the bolts 68 in opposite directions. Suitable fasteners 72 secure the plates 70 against flats 73 on the cylinder 74. By adjusting the radial clearance 64, the shearing action on the material passing over the longitudinal dams 48' may be controlled, such adjustment being permitted even while the feed screw 75 is turning.

Figure 8:
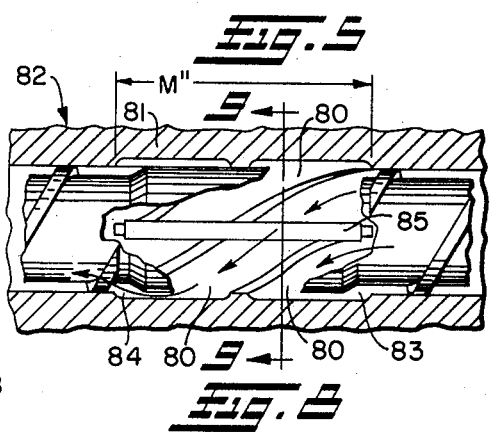
FIG. 8 is an enlarged longitudinal section through another mixing section embodiment in accordance with this invention, with a portion of the feed screw broken away to show the helical flute configuration in the cylinder barrel.
Figure 9:
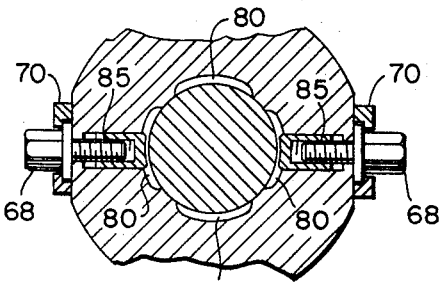
FIG. 9 is a fragmentary transverse section through the mixing section of FIG. 8, taken on the plane of the line 9—9.

The feed screws 51 and 75 of the FIGS. 4 and 6 embodiments may also be longitudinally adjusted to vary the restrictions at the inlet end of the incoming flutes 40 and 76, similar to the feed screw 3 of the FIG. 1 embodiment. Moreover, all of the flutes 80 in the cylinder wall 81 of the extruder 82 may be spiraled as shown in FIGS. 8 and 9 so that they are self cleaning. Each flute 80 is in communication with the inlet and exit ends 83 and 84 of the mixing section M'', but they are intersected intermediate their ends by longitudinal dams 85 which restrict the flow through the flutes. The dams 85 may be radially adjustable for varying the restriction, similar to the dams 48' of the FIGS. 6 and 7 embodiment.

From the above discussion, it can now be seen that the various extruder embodiments disclosed herein provide for greatly increased mixing of the material as it passes from the feed flight through the flutes in the cylinder wall at the mixing section. By providing only inlet or outlet flow into and from alternate ones of the flutes with restricted communication between the incoming flutes and an adjacent exiting flute, all of the material is required to pass through the restrictions before leaving the mixing section which has an additional shearing and conditioning effect on the material that may be controlled by radial adjustment of the restriction, as desired.

Other modes of applying the principles of the invention may be employed, change being made as regards the details described, provided the features stated in any of the following claims or the equivalent of such be employed.

I, therefore, particularly point out and distinctly claim as my invention:

1. An extruder for plastic and like material having a cylinder and a feed screw disposed in the bore of said cylinder, said feed screw being rotatable in said bore for advancing the material through said cylinder; wherein the improvement comprises a plurality of longitudinally extending, circumferentially spaced flute means in an annular portion of the wall of the cylinder bore into which the material is fed by said feed screw, said flute means being operative to continually slice the material into thin layers as it is advanced by said feed screw thereby substantially mixing the material passing through said flute means.

2. The extruder of claim 1 wherein said feed screw in the region of said plural flute means has a smooth annular rib of substantially the same diameter as said cylinder bore, and there is a restriction between the end of said flute means and said smooth annular rib through which the material passes.

3. The extruder of claim 2 further comprising means providing for longitudinal adjustment of said feed screw to vary the size of said restriction.

4. The extruder of claim 1 wherein said flute means are formed in a mixer valve ring received in an undercut in the wall of said cylinder bore.

5. The extruder of claim 1 further comprising additional flute means in said annular wall portion between each of said first-mentioned flute means, said feed screw in the region of said first-mentioned additional flute means having a smooth annular rib of substantially the same diameter as the inside diameter of said flute means, said first-mentioned flute means having communication with said feed screw only at the upstream end of said smooth annular rib, and said additional flute means having communication with said feed screw only at the downstream end of said smooth annular rib, and means providing restrictive communication between said first-mentioned flute means and an adjacent one of said additional flute means, whereby the material entering said first-mentioned flute means must pass through the restriction between said first-mentioned flute means and an adjacent one of said additional flute means before exiting from the downstream end of said smooth annular rib.

6. The extruder of claim 5 wherein said means providing such restrictive communication between said first-mentioned flute means and an adjacent one of said additional flute means comprises a longitudinal dam therebetween in the wall of said cylinder bore having a radial clearance with said smooth annular rib.

7. The extruder of claim 6 wherein said longitudinal dams are formed by longitudinal ribs on the wall of said cylinder bore which provide a fixed radial clearance.

8. The extruder of claim 6 wherein said longitudinal dams are formed by elongated bar members disposed in longitudinal slots in said cylinder, and means are provided for adjusting the radial position of said elongated bar members to vary such radial clearance.

9. The extruder of claim 1 wherein said feed screw in the region of said plural flute means has a smooth annular rib of substantially the same diameter as said cylinder bore, said flute means being in the form of spiral grooves communicating with said feed screw adjacent opposite ends of said annular rib, and means are provided intermediate the ends of said flute means for restricting the flow through said flute means.

10. The extruder of claim 9 wherein said restriction means comprises longitudinal dams in the wall of said cylinder bore which intersect said flute means intermediate their ends.

11. An extruder comprising a cylinder having an inlet for introduction of plastic and like material and an outlet longitudinally spaced from said inlet, and a feed screw rotatable in said cylinder for advancing the material from said inlet to said outlet, said cylinder intermediate said inlet and outlet having a mixing section formed by a plurality of longitudinally extending, circumferentially spaced flutes in the inner wall of said cylinder, and a smooth annular rib on said feed screw in the region of said flutes having a close clearance with said inner wall, alternate ones of said flutes respectively having communication with only the inlet and outlet ends of said mixing section, and restriction means providing restrictive communication with the flutes in communication with the inlet end and an adjacent one of the flutes in communication with the outlet end of said mixing section, whereby the material entering said mixing section through the inlet opening flutes must pass through said restriction means into said outlet opening flutes before exiting from the mixing section.

12. The extruder of claim 11 wherein said means providing such restricted communication between said inlet opening and an adjacent one of said outlet opening flutes comprises a longitudinal dam therebetween in the inner wall of said cylinder having a radial clearance with said smooth annular rib.

13. The extruder of claim 12 wherein said longitudinal dams are formed by longitudinal ribs on the inner wall of said cylinder which provide a fixed radial clearance.

14. The extruder of claim 12 wherein said longitudinal dams are formed by elongated bar members disposed in longitudinal slots in said cylinder, and means are provided for adjusting the radial position of said elongated bar members to vary such radial clearance.

15. The extruder of claim 14 wherein said means for adjusting the radial position of said elongated bar members comprises a plurality of bolts having threaded engagement in radial bores in said elongated bar members, and means for holding said bolts against radial but not rotational movement, whereby rotation of said bolts in opposite directions causes radial inward and outward movement of said bar members.

References Cited

UNITED STATES PATENTS

| 2,595,455 | 5/1952 | Heston. |
| 2,970,341 | 2/1961 | Mallory et al. |
| 3,164,563 | 1/1965 | Maxwell. |
| 3,382,536 | 5/1968 | Fritsch et al. |

FOREIGN PATENTS

| 452,810 | 11/1948 | Canada. |

WILLIAM J. STEPHENSON, Primary Examiner